US012676894B2

(12) United States Patent
Frank et al.

(10) Patent No.: US 12,676,894 B2
(45) Date of Patent: Jul. 7, 2026

(54) SOFTWARE DEFINED REMOTE ACCESS FOR ZERO-TRUST SUPPORT

(71) Applicant: Siemens Aktiengesellschaft, Munich (DE)

(72) Inventors: Reinhard Frank, Münich (DE); Florian Zeiger, Höhenkirchen-Siegertsbrunn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 177 days.

(21) Appl. No.: 18/559,424

(22) PCT Filed: May 3, 2022

(86) PCT No.: PCT/EP2022/061806
§ 371 (c)(1),
(2) Date: Nov. 7, 2023

(87) PCT Pub. No.: WO2022/238177
PCT Pub. Date: Nov. 17, 2022

(65) Prior Publication Data
US 2024/0250993 A1     Jul. 25, 2024

(30) Foreign Application Priority Data
May 11, 2021   (EP) .................................... 21173365

(51) Int. Cl.
*H04L 9/40*               (2022.01)
(52) U.S. Cl.
CPC .......... *H04L 63/20* (2013.01); *H04L 63/0209* (2013.01)

(58) Field of Classification Search
CPC ............................ H04L 63/20; H04L 63/0209
See application file for complete search history.

(56) References Cited

U.S. PATENT DOCUMENTS

2019/0312860 A1    10/2019   Dykes
2020/0336466 A1    10/2020   Goldschlag
(Continued)

OTHER PUBLICATIONS

Rose et al. (Zero Trust Architecture, NIST Special Publication 800-207, Aug. 2020, 59 pages) (Year: 2020).*
(Continued)

*Primary Examiner* — Oleg Korsak
(74) *Attorney, Agent, or Firm* — Slayden Grubert Beard PLLC

(57)                ABSTRACT
Various embodiments of the teachings herein include an automated method for data access to a device by an external client, allowing the device to communicate with an internal communication network while the external client communicates with an external communication network. An example method includes: sending a communication access request from the external client for the device to a software implemented application access point; configuring a corresponding software implemented connector using the application access point, so the connector acts as an endpoint for a communication tunnel to the device; configuring a corresponding software implemented policy decision point using the application access point as an interface to the external network for arriving of application data traffic of the external client, so the policy decision point is set up to validate, accept, and forward the access request of the external client to the connector; and accessing the device via the communication tunnel.

8 Claims, 2 Drawing Sheets

(56) References Cited

U.S. PATENT DOCUMENTS

2024/0289906 A1 *   8/2024   Williams ................ G06F 21/64
2025/0047910 A1 *   2/2025   Fear ................. H04N 21/23424

OTHER PUBLICATIONS

Search Report for International Application No. PCT/EP2022/
061806, 12 pages, Aug. 22, 2022.
Kern, Alexander et al: "Securing Industrial Remote Maintenance
Sessions using Software-Defined Networking"; 2019 Sixth Inter-
national Conference on Software Defined Systems (SOS), IEEE, pp.
72-79, Jun. 10, 2019.

* cited by examiner

FIG 1

SOFTWARE DEFINED REMOTE ACCESS FOR ZERO-TRUST SUPPORT

CROSS-REFERENCE TO RELATED APPLICATIONS

This application is a U.S. National Stage Application of International Application No. PCT/EP2022/061806 filed May 3, 2022, which designates the United States of America, and claims priority to EP Application No. 21173365.4 filed May 11, 2021, the contents of which are hereby incorporated by reference in their entirety.

TECHNICAL FIELD

The present disclosure relates to data security. Various embodiments of the teachings herein include systems and/or automated methods for data access to a device by an external client, whereby the device can communicate with an internal communications network and the external client is able to communicate with an external network.

BACKGROUND

A common approach for remote connectivity is based on Virtual Private Network (VPN) technology. Therefore, different underlying technologies such as IPsec (Internet Protocol Security) or tunnels on application layer exist. Typically, such an access is configured once—usually with a significant effort involving office administration as well as IT administration. Such complicated administrative processes usually end up in static configuration, valid for a specified duration (usually months). Dynamic access configuration from external clients to devices in a shopfloor with on-demand setup of services are not efficiently possible through existing VPN technologies.

The proposed approach also considers common practices in OT (Operational Technology) networking, such as no direct connectivity of devices from the shopfloor to the Internet, hiding OT-specific configuration parameters (e.g., IP addresses) from the outside world, and scheduled and time limited access availability for a minimal attack surface. It is also desirable to implement the context matching to ensure that process requirements are not sacrificed due to IT/OT maintenance procedures. Together with the application specific communication channel through defined connectors, only required protocol stacks are available and the authentication/authorization procedures support users' roles on application and communication service level.

State-of-the-Art approaches are based on VPN technology. Thus, dynamic setups are not possible or require a huge manual effort. Access decisions based on user roles on application level while also considering the device context are not possible.

Operational technology (OT) is hardware and software that detects or causes a change, through the direct monitoring and/or control of industrial equipment, assets, processes, and events. The term has become established to demonstrate the technological and functional differences between traditional IT systems and Industrial Control Systems environment, the so-called "IT in the non-carpeted areas".

SUMMARY

The teachings of the present disclosure provide software solutions for zero-trust remote access to devices in an OT network. For example, some embodiments include an automated method for data access to a device (D) by an external client (EC), whereby the device (D) communicates with an internal communication network (IN) and the external client (EC) communicates with an external communication network (EN), comprising: by the external client (EC) sending a communication access request for the device (D) to a software implemented application access point (AAP), which is set up to check and authorize or reject access requests from external clients (EC) to devices (D), by the application access point (AAP) configuring a corresponding software implemented connector (C), so that the connector (C) is acting as an endpoint for a communication tunnel (NT) to the device (D), by the application access point (AAP) configuring a corresponding software implemented policy decision point (PDP) as an interface to the external network (EN) for arriving of application data traffic of the external client (EC), whereby the policy decision point (PDP) is set up to validated accept and forward the access request of the external client (EC) to the connector (C), and accessing the device (D) via the communication tunnel (NT) by the external client (EC).

In some embodiments, the policy decision point (PDP) and the connector (C) are part of a demilitarized zone (DMZ) of the internal network.

In some embodiments, the connector (C) is set up to act as the endpoint for a scheduled time window and to allow a setup of the communication tunnel (NT), as well as setting permissions for the external client (EC) to use the communication tunnel (NT) for the application data traffic.

In some embodiments, for checking the access request the application access point (AAP) is performing a context matching with a device digital twin (DDT) of the device (D).

In some embodiments, the device digital twin (DDT) is set up with process related data of the device (D), configuration data of the device (D), and OT parameters of the device (D).

In some embodiments, the device digital twin (DDT) is set up to interact with the application access point (AAP) to validate external clients' (EC) connection requests, and in case of a successful request-validation to notify the device (D) and to schedule the configuration, setup, and activation of a software implemented policy enforcement point (PEP) on the device (D).

In some embodiments, the policy enforcement point (PEP) is configured to act as a communication tunnel (NT) endpoint, created on-demand, and locally on the device (D) after prior validation of the access request of the external client (EC).

As another example, some embodiments include a communication network arrangement for data access, comprising: an internal communication network (IN), an external communication network (EN), an external client (EC) communicating with the external network (EN), a device (D) communicating with the internal network (IN), a software implemented application access point (AAP), which is set up to check and authorize or reject a connection access requests from the external clients (EC) to the device (D), a software implemented connector (C) of the internal network (IN), which is set up to be configured by the application access point (AAP), so that the connector (C) is acting as an endpoint for a communication tunnel (NT) to the device (D), and a software implemented policy decision point (PDP) of the internal network (IN), which is set up to be configured by the application access point (AAP) as an interface to the external network (EN) for arriving of application data traffic of the external client (EC), and which is set up to validated accept and forward access request of the external client (EC) to the connector (C).

In some embodiments, the policy decision point (PDP) and the connector are part of a demilitarized zone of the internal network.

In some embodiments, the connector (C) is set up to act as the endpoint for a scheduled time window and to allow a setup of the communication tunnel (NT), as well as setting permissions for the external client to use the communication tunnel (NT) for the application data traffic.

In some embodiments, the arrangement further comprises a device digital twin (DDT) of the device, whereby the application access point is further set up to check the access request by performing a context matching with the device digital twin.

In some embodiments, the device digital twin (DDT) is set up with process related data of the device, configuration data of the device, and OT parameters of the device.

In some embodiments, the arrangement further comprises a software implemented policy enforcement point (PEP) on the device (D), whereby the device digital twin is set up to interact with the application access point to validate external clients' connection requests, and in case of a successful request validation to notify the device and to schedule the configuration, setup, and activation of the policy enforcement point.

In some embodiments, the policy enforcement point (PEP) is configured to act as a communication tunnel (NT) endpoint, created on-demand, and locally on the device after prior validation of the access request of the external client (EC).

BRIEF DESCRIPTION OF THE DRAWINGS

Further benefits and advantages of the teachings of the present disclosure will become apparent after a careful reading of the detailed description with appropriate reference to the accompanying drawings. In the drawings:

FIG. 1 shows a block diagram of an example communication arrangement incorporating teachings of the present disclosure.

DETAILED DESCRIPTION

Figure 2:
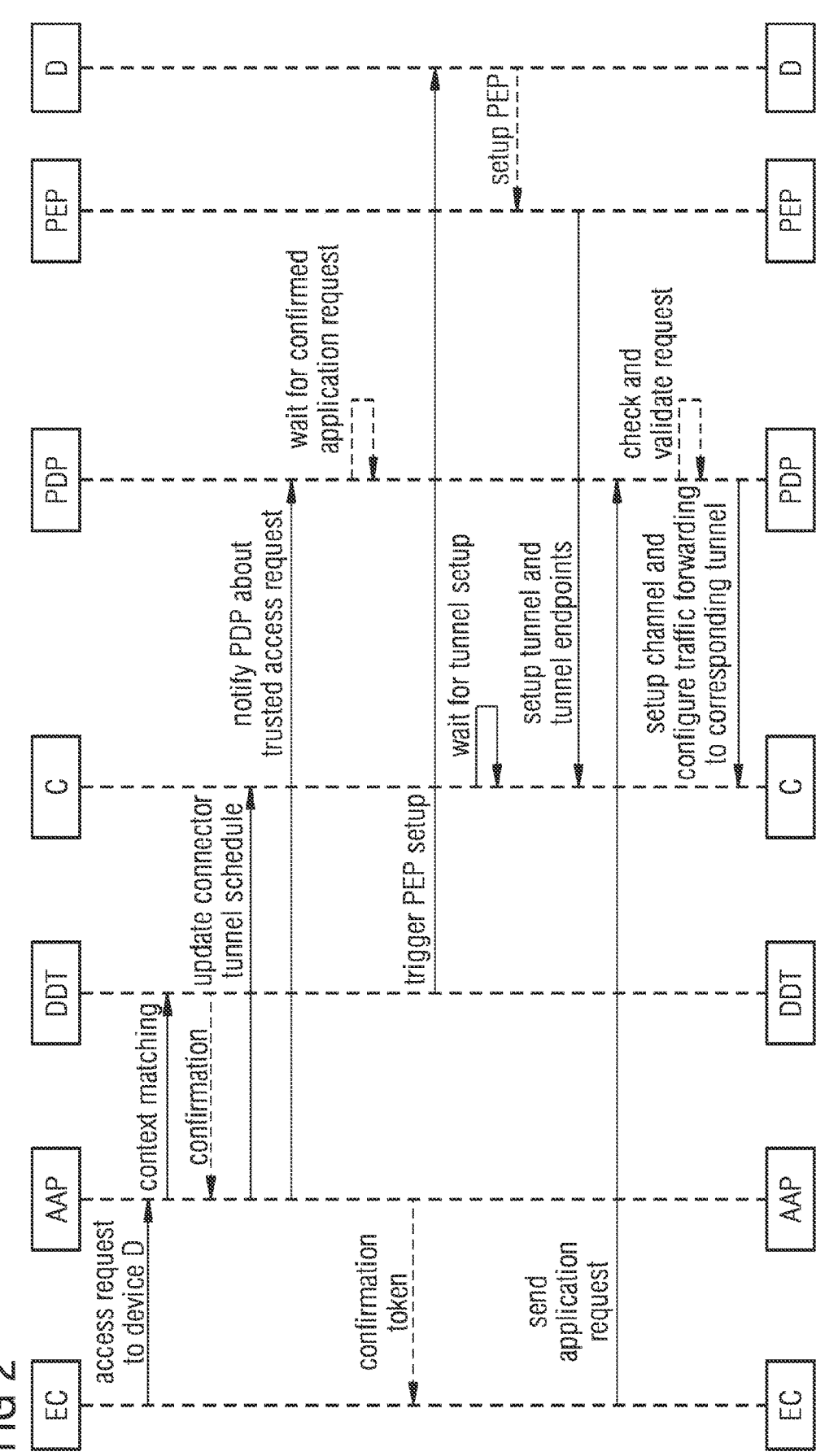
FIG. 2 shows a flow chart for an example method incorporating teachings of the present disclosure including an access request from an external client.

The zero-trust security model sometimes known as perimeterless security, describes an approach to the design and implementation of IT systems. The main concept behind zero trust is that devices should not be trusted by default, even if they are connected to a managed corporate network such as the corporate LAN and even if they were previously verified.

In most modern enterprise environments, corporate networks consist of many interconnected segments, cloud-based services and infrastructure, connections to remote and mobile environments, and increasingly connections to non-conventional IT, such as IoT devices. The once traditional approach of trusting devices within a notional corporate perimeter, or devices connected to it via a VPN, makes less sense in such highly diverse and distributed environments. Instead, the zero-trust approach advocates mutual authentication, including checking the identity and integrity of devices irrespective of location, and providing access to applications and services based on the confidence of device identity and device health in combination with user authentication.

The systems and methods described herein offer the possibility to activate on-demand access to devices on a shopfloor while considering users' roles on application level and context of the device. The access request is separated from the data flow and the authentication procedure synchronizes with the device context to augment the connection request with OT specific parameters.

Thus, external clients do not need OT specific configuration information such as IP addresses and can specify their request solely based on user and application parameters. Tunnels automatically create a special type of overlay networks between policy enforcement points on device level and connectors in an internal demilitarized zone network, thus separating device and application specific traffic from each other. Policy decision points, where application data traffic arrives from external clients, are network functions defined through software and can dynamically be placed where necessary.

Some embodiments include an automated method for data access to a device by an external client, whereby the device communicates with an internal communications network and the external client communicates with an external network, comprising:

by the external client sending a communication access request for the device to a software implemented application access point, which is set up to check and authorize or reject access requests from external clients to devices, by the application access point configuring a corresponding software implemented connector, so that the connector is acting as an endpoint for a communication tunnel to the device, by the application access point configuring a corresponding software implemented policy decision point as an interface to the external network for arriving of application data traffic of the external client, whereby the policy decision point is set up to validated accept and forward the access request of the external client to the connector, and accessing the device via the communication tunnel by the external client.

In some embodiments, the external network includes an internet. The internal network may include an OT network.

In some embodiments, the policy decision point and the connector are part of a demilitarized zone of the internal network.

In some embodiments, the connector is set up to act as the endpoint for a scheduled time window and to allow a setup of the communication tunnel, as well as setting permissions for the external client to use the communication tunnel for the application data traffic.

In some embodiments, for checking the access request, the application access point is performing a context matching with a device digital twin of the device.

In some embodiments, the device digital twin is set up with process related data of the device, configuration data of the device, and OT parameters of the device.

In some embodiments, the device digital twin is set up to interact with the application access point to validate external clients' connection requests, and in case of a successful request-validation to notify the device and to schedule the configuration, setup, and activation of a software implemented policy enforcement point on the device.

In some embodiments, the policy enforcement point is configured to act as a communication tunnel endpoint, created on-demand, and locally on the device after prior validation of the access request of the external client.

Some embodiments include a communication network arrangement for data access, comprising:

an internal network, an external network, an external client communicating with the external network, a device communicating with the internal network, a software implemented application access point, which is set up to check and authorize or reject a connection access requests from the external clients to the device, a software implemented connector of the internal network, which is set up to be configured by the application access point, so that the connector is acting as an endpoint for a communication tunnel to the device, and a software implemented policy decision point of the internal network, which is set up to be configured by the application access point as an interface to the external network for arriving of application data traffic of the external client, and which is set up to validated accept and forward access request of the external client to the connector.

In some embodiments, the policy decision point and connector are part of a demilitarized zone of the internal network.

In some embodiments, the connector is set up to act as the endpoint for a scheduled time window and to allow a setup of the communication tunnel, as well as setting permissions for the external client to use the communication tunnel for the application data traffic.

In some embodiments, the arrangement comprises a device digital twin of the device, whereby the application access point is further set up to check the access request by performing a context matching with the device digital twin.

In some embodiments, the device digital twin is set up with process related data of the device, configuration data of the device, and OT parameters of the device.

In some embodiments, the arrangement comprises a software implemented policy enforcement point, whereby the device digital twin is set up to interact with the application access point to validate external clients' connection requests, and in case of a successful request validation to notify the device and to schedule the configuration, setup, and activation of the policy enforcement point on the device.

In some embodiments, the policy enforcement point is configured to act as a communication tunnel endpoint, created on-demand, and locally on the device after prior validation of the access request of the external client.

In some embodiments, external connectivity requests are automatically injected into a device trust and device identity process, therewith supporting dynamicity of requests in terms of time, type of service, and service quality requirements. By introducing the context matching, service specific information (e.g., protocols, bandwidth, device serial number), security information (e.g., user permissions, roles, certificates), and OT specific configurations (e.g., IP addresses, OT network configurations, VLANs), or process related information (e.g., busy times, usage pattern, maintenance schedules) are separated.

The approach can be integrated in future zero-trust network designs. Intelligent devices trigger the connection setup as soon as their context allows it, and the configured communication is encapsulated. The approach does not rely on network specific information and settings, as the established communication channel is a special type of overlay network. Policy Decision Points (PDP) are SW components that can be placed dynamically in the required network locations and offer network functions on demand (e.g., linking the PDP to the corresponding connector).

Figure 1:
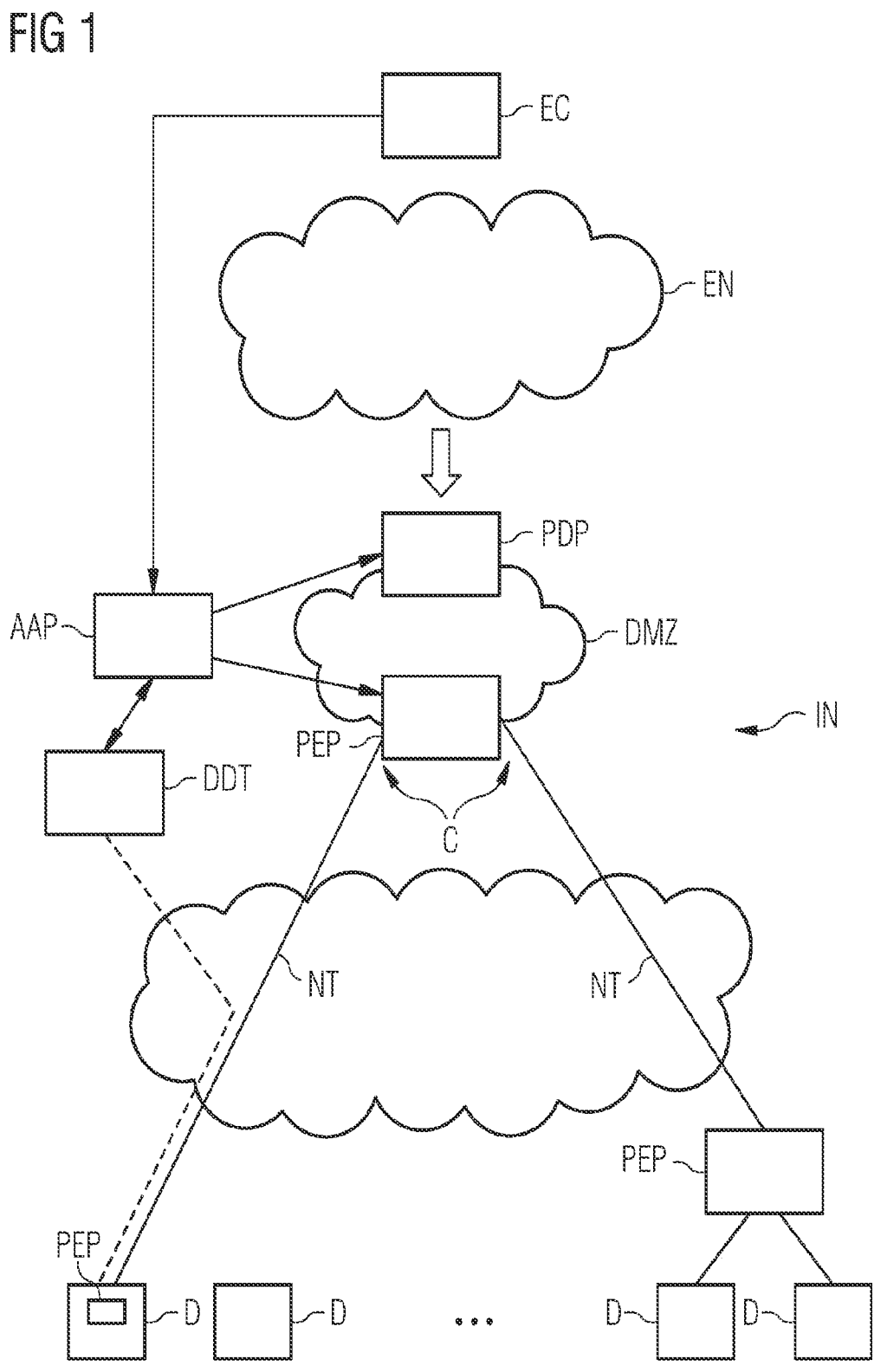

An embodiment of the teachings herein is shown in FIG. 1, illustrating an overview of an example network arrangement. The arrangement comprises the following components:

External Client EC: The external client EC is hosting external applications and is connected to the internet. Applications on the external client EC request communication access to devices D.

Therefore, the external client EC is sending a connection request (=communication access request) to an Application Access Point AAP to get approval for connecting via the Policy Decision Point PDP to the corresponding device D.

Application Access Point AAP: It is responsible to check, authorize or reject connection requests from applications to devices D. As applications have different roles, purpose and access policies, the application access point AAP is performing a context matching with a Device Digital Twin DDT. This also allows to take process data into account for validation of the connection request (e.g., is a forklift available for firmware update—if not, when is it available?). In case of successful validations, the application access point AAP notifies the device digital twin DDT, as well as Connector(s) C and Policy Decision Point(s) PDP and schedules the activation of appropriate communication tunneling mechanisms for connectivity.

Device Digital Twin DDT: It knows about process related data of devices D (e.g., timely availability for firmware upgrades, error logs), device configuration (SW versions, serial numbers), as well as important OT parameters of the device D (e.g., IP address, supported protocols, access rules). It can interact with the application access point AAP to validate users' connection requests. In case of a successful request validation, the device digital twin DDT notifies the devices D and schedules the configuration, setup, and activation of a "Policy Enforcement Point PEP" on the device D.

Policy Decision Point PDP: It is an external interface, where application data traffic arrives from an external network EN. Only for sessions validated by the access application point AAP, traffic is forwarded to the corresponding connector C (e.g., the rule set for policy decision points PDP decisions is created by the application access point AAP based on the result of context matching).

Connector C: It is a communication tunnel endpoint created on-demand after prior validation of an application's connection request for remote access to a device D. The connector C resides in the internal Demilitarized Zone DMZ of the internal network IN and allows only to be accessible by pre-defined connection requests of an authorized policy decision point PDP. Implementation for accepted data traffic exchange between the policy decision point PDP and the connector C would be via network functions on programmable forwarding plane level or via eBPF.

Policy Enforcement Point PEP: It is a communication tunnel NT endpoint, created on-demand, locally on a device D after prior validation of an application's connection request for remote access.

Device D: It is a device D in e.g., shopfloor, connected to for example OT networks (=internal network IN). Devices D are not accessible from remote locations without prior authorization via access application points AAP.

Internal Demilitarized Zone DMZ: It separates internal networks IN from external networks EN and supports defined connectivity between policy decision point(s) PDP and Connector(s) C.

Internal Network(s) IN: It provides connectivity mechanisms for devices D but does not allow external access without validation through application access points AAP.

External Network(s) EN: It connects external clients EC to the application access point(s) AAP and policy decision point(s) PDP.

FIG. 2 is a flowchart illustrating an example process incorporating teachings of the present disclosure using an arrangement according to FIG. 1. The method shown comprises: Access request for device D: The external client EC sends an access request for a specific device D to the application access point AAP. The access request specifies the service that should be used, the required protocol(s), a time schedule, the target/destination, and data traffic parameters/requirements. All parameters are specified from the user's point of view and do not consider factory specific configurations (e.g., firmware update, 23:30-23:45, https via port 8080, high bandwidth, 300 MB, device serial number 123456, user=maintenance, role=admin, certificate). It is important to notice, that this request does not contain factory specific configuration parameters such as IP addresses. This access request also contains a user, its desired role, and a certificate to ensure identification and authenticity of the request.

Context Matching: is required for augmenting the request with internal (only known inside factory) parameters, e.g., "translating" the device serial number to an IP address, performing authentication and authorization of the external client EC (=user), the requested role, and the certificate, checking the context—e.g., check for device D availability depending on the production process, check firmware versions and update requests, configuring the corresponding connector(s) C, so that it will act as a communication tunnel NT endpoint at the scheduled time window and allows communication tunnel NT setup, as well as setting permissions for the user/role to use the communication tunnel NT for the specified data traffic/service, configuration of corresponding policy decision point(s) PDP so that the access request of the external client EC can be validated accepted and forwarded to the corresponding connector(s) C.

Update connector C and policy decision points PDP: Both component types—the connectors C and the policy decision points PDP—must be updated during runtime, so that they are synchronized and accept the connection requests and communication tunnel NT setups in the scheduled time slot.

Setup policy enforcement point PEP and communication tunnel (s) NT: At the scheduled time, the configured devices D D establish a policy enforcement point PEP and a communication tunnel NT to the corresponding connector C in the internal demilitarized zone DMZ.

The communication tunnel NT endpoints are the policy enforcement point PEP on the device D and the connector C in the demilitarized zone DMZ.

Setup Channel/mapping between policy decision point PDP and connector C: As soon as a communication tunnel NT between connector C and policy enforcement point PEP is up and running it can be used for data transport. In addition, the policy decision point PDP is also activated and ensures that only previously authenticated and scheduled data connections are accepted and forwarded from policy decision point PDP to connector C. Common technologies for this task are packet filters (e.g., EBPF or programmable forwarding planes with P4).

Although the teachings herein have been explained in relation to example embodiments as mentioned above, it is to be understood that many other possible modifications and variations can be made without departing from the scope of the present disclosure. It is, therefore, contemplated that the appended claim or claims will cover such modifications and variations that fall within the true scope therein.

LIST OF REFERENCE SIGNS

APP Application Access Point
C Connector
D Device
DDT Device Digital Twin
DMZ Demilitarized Zone
EC External Client
EN External Network
IN Internal Network
NT Communication Network Tunnel
PDP Policy Decision Point
PEP Policy Enforcement Point

What is claimed is:

1. A method for data access to a device by an external client, allowing the device to communicate with an internal communication network while the external client communicates with an external communication network, the method comprising:

sending a communication access request from the external client for the device to a software implemented application access point to check and authorize or reject access requests from external clients to devices;

configuring a corresponding software implemented connector using the application access point, so the connector acts as an endpoint for a communication tunnel to the device;

configuring a corresponding software implemented policy decision point using the application access point as an interface to the external network for arriving of application data traffic of the external client, so the policy decision point is set up to validate, accept, and forward the access request of the external client to the connector; and accessing the device via the communication tunnel using the external client;

wherein checking the access request the application access point includes performing a context matching with a device digital twin of the device.

2. A method according to claim 1, wherein the device digital twin is set up with process related data of the device, configuration data of the device, and operational technology (OT) parameters of the device.

3. A method according to claim 1, wherein the device digital twin is set up to:

interact with the application access point to validate external clients' connection requests; and in case of a successful request-validation to notify the device and to schedule the configuration, setup, and activation of a software implemented policy enforcement point on the device.

4. A method according to claim 3, wherein the policy enforcement point acts as a communication tunnel endpoint, created on-demand, and locally on the device after prior validation of the access request of the external client.

5. A communication network system, the system comprising:

an internal communication network;

an external communication network;

an external client communicating with the external network;

a device communicating with the internal network;

a software implemented application access point to check and authorize or reject a connection access requests from the external clients to the device;

a software implemented connector of the internal network to be configured by the application access point, so the connector acts as an endpoint for a communication tunnel to the device;

a software implemented policy decision point of the internal network to be configured by the application access point as an interface to the external network for arriving of application data traffic of the external client, and to validate, accept, and forward access requests of the external client to the connector; and a device digital twin of the device;

wherein the application access point is further set up to check the access request by performing a context matching with the device digital twin.

6. A system according to claim 5, wherein the device digital twin is set up with process related data of the device, configuration data of the device, and operational technology (OT) parameters of the device.

7. A system according to claim 5, further comprising:

a software implemented policy enforcement point (PEP) on the device;

wherein the device digital twin is set up to interact with the application access point to validate external clients' connection requests, and in case of a successful request validation to notify the device and to schedule the configuration, setup, and activation of the policy enforcement point.

8. A system according claim 7, wherein the policy enforcement point acts as a communication tunnel endpoint, created on-demand, and locally on the device after prior validation of the access request of the external client.

* * * * *